United States Patent [19]
Brown

[11] Patent Number: 6,163,256
[45] Date of Patent: Dec. 19, 2000

[54] BRAKE LIGHT APPARATUS

[76] Inventor: Jeffrey C. Brown, 15205 S. 25th St., Phoenix, Ariz. 85048

[21] Appl. No.: 09/398,274

[22] Filed: Sep. 20, 1999

[51] Int. Cl.[7] ....................................... G60Q 1/44
[52] U.S. Cl. .......................... 340/479; 340/463; 340/468; 73/862.627
[58] Field of Search .................. 340/479, 463, 340/467, 468, 469; 73/862.627

[56] References Cited

U.S. PATENT DOCUMENTS

| | | | |
|---|---|---|---|
| 4,682,146 | 7/1987 | Friedman, III . | |
| 4,888,997 | 12/1989 | Eckert et al. | ........................ 73/862.65 |
| 5,150,098 | 9/1992 | Rakow | ..................................... 340/479 |
| 5,606,310 | 2/1997 | Egger et al. . | |
| 5,610,578 | 3/1997 | Gilmore | ................................. 340/379 |
| 5,682,137 | 10/1997 | Li . | |
| 5,831,523 | 11/1998 | Lange . | |

*Primary Examiner*—Julie Lieu
*Attorney, Agent, or Firm*—H. Gordon Shields

[57] ABSTRACT

Brake pressure indication apparatus in a vehicle includes a plurality of red L.E.D.s arranged in a ladder-like configuration. The L.E.D.s illuminate progressively in response to brake pressure. As brake pressure is increased, more L.E.D.s illuminate. Brake pressure may be sensed in either of two ways, such as movement of the brake pedal or the expansion of a flexible brake hose.

4 Claims, 2 Drawing Sheets

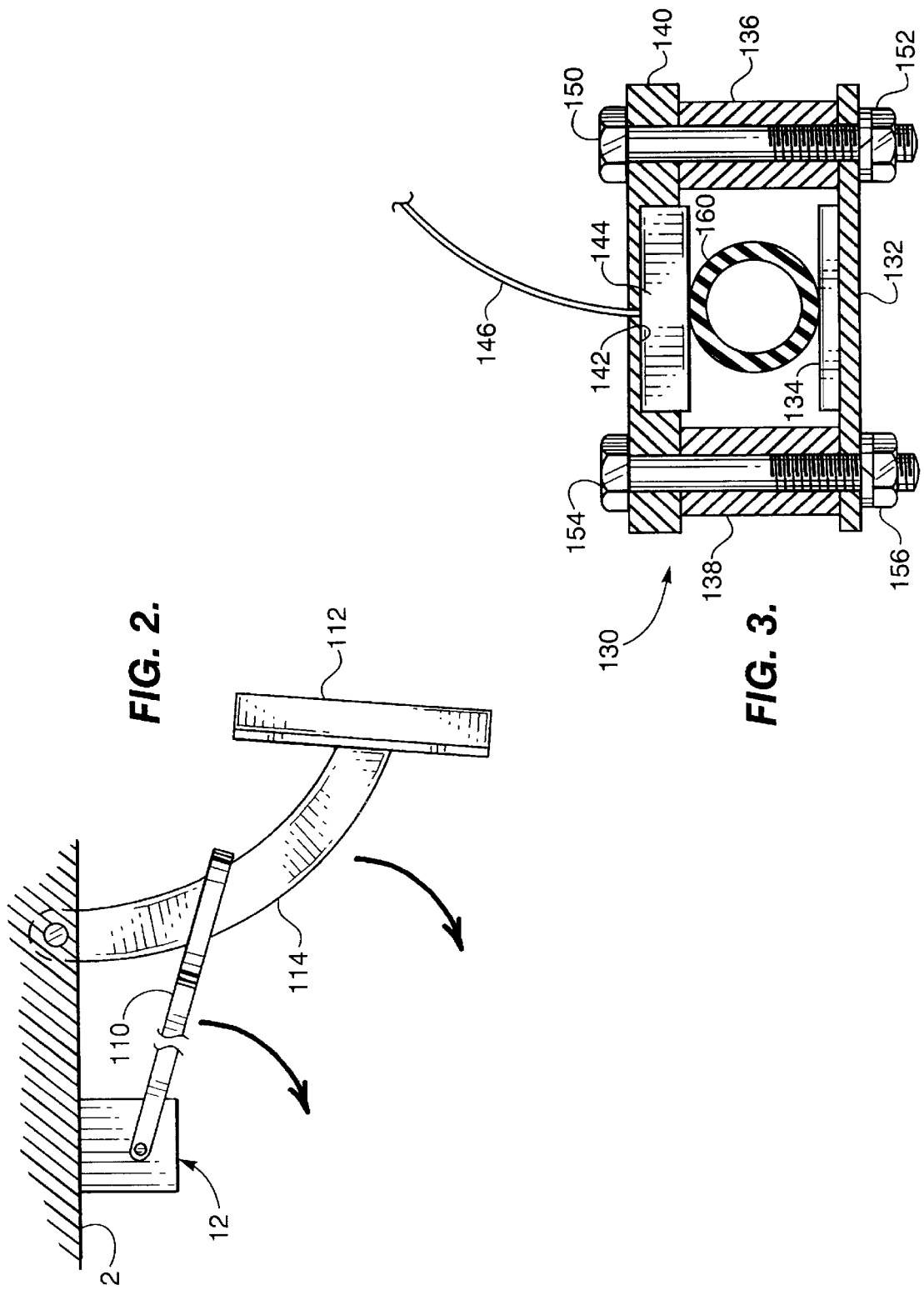

BRAKE LIGHT APPARATUS

BACKGROUND OF THE INVENTION

1. Field of the Invention

This invention relates to vehicle brake lights and, more particularly, to vehicle brake lights having a plurality of lights with the lights illuminating in response to the degree of brake application pressure.

2. Description of the Prior Art

U.S. Pat. No. 4,682,146 (Friedman) discloses an indicator light system using a horizontally disposed tube filled with a rare gas. The gas tube is connected to turn signal indicators and the light in the tube propagates from either the left hand side of the tube or the right hand side of the tube, depending on the direction of travel of the vehicle. For a left hand turn, the light propagates from the right hand side progressively to the left hand side, indicating a left turn. For a right turn, the opposite happens. That is, the light propagates from the left side progressively to the right side. The apparatus is not degree-based responsive.

U.S. Pat. No. 5,606,310 (Egger et al) discloses a safety system in which a pair of lights illuminate when hard braking pressure is applied. A pressure transducer is used to sense the pressure of the brake pedal application. The system is coupled to the ordinary brake light system to provide different light effects depending on brake pressure applied. However, the light effects could be mistaken as a hazard warning light function.

U.S. Pat. No. 5,610,578 (Gilmore) discloses a light system indicative of pressure application on the brake system. Deceleration is sensed as well as brake pressure application. The brake illumination system provides brake light intensity as a function of the deceleration of the vehicle. The motion of the brake arm during braking is used as a determining element. This apparatus, like the '310 (Egger) apparatus, utilizes the brake lights in an ordinary brake light system circuit. No additional lights or light elements are used. The apparatus is dependent on ambient conditions and bulb life to indicate intensity. Its is unclear how light intensity is translated into vehicle deceleration.

U.S. Pat. No. 5,682,137 (Li) discloses a safety system for vehicles which indicates acceleration and deceleration of the vehicle. The system utilizes inertial forces to determine acceleration and deceleration and sequentially activates lights in response to acceleration and deceleration. Red lights are used in response to deceleration, and green lights are used in response to acceleration. It will be noted that a problem with this system is that changes in the attitude of the vehicle will also cause changes of the sensitivity of the apparatus. That is, going uphill or going downhill which changes the attitude of the vehicle, will result false indications of acceleration or deceleration. The apparatus is also sensitive to vehicle loading changes which affect the attitude of the vehicle.

U.S. Pat. No. 5,831,523 (Lange) discloses a vehicle light system which uses a plurality of spaced apart light emitting diodes disposed about the rear window. Both red and yellow L.E.D.s are used with yellow L.E.D.s used as an adjunct to the directional indicators and red L.E.D.s tied into the brake system. The red L.E.D.s are activated when the brake light system is activated. The lights actuate sequentially, not in response to brake pressure. The red lights actuate sequentially as an indication that the brakes have been actuated, but they are not indicative of brake pressure. That is, the apparatus is independent of brake application intensity. The red L.E.D.s illuminate sequentially from the top center of the rear window outwardly and downwardly on the sides of the window.

The apparatus of the present invention utilizes red L.E.D.s or high intensity lamps or the like which illuminate sequentially in response to intensity of brake application pressure. That is, a ladder-effect of the red L.E.D.s occurs in direct response to brake pressure. Two embodiments are included, the first being an original equipment type installation and the second being an after market installation.

SUMMARY OF THE INVENTION

The invention described and claimed herein comprises a brake light system in which appropriate red lamps or L.E.D.s are sequentially illuminated in response to brake pressure application. The lamps are arranged in a ladder-like configuration and they illuminate successively in response to brake pressure. The brake light of the standard brake circuit is tied into the lamps. Two different types of sensors are used, one is a simple potentiometer responsive to movement of the brake pedal for original equipment installation and the second is an after market application in which a strain gauge sensor is used to sense brake pressure. The strain gauge sensor is tied to a flexible brake line, and the expansion of the brake line in response to increased brake pressure is used to cause an output in the strain gauge sensor.

Among the objects of the present invention are the following:

To provide new and useful brake light apparatus;

To provide new and useful brake light apparatus having a plurality of red lamps;

To provide new and useful apparatus for indicating braking in a vehicle;

To provide new and useful apparatus indicating the intensity of brake pressure applied to a vehicle utilizing a plurality of red lamps;

To provide new and useful indicators of the intensity of application of brake pressure in a vehicle; and To provide new and useful apparatus for sensing and indicating brake pressure application in a vehicle.

BRIEF DESCRIPTION OF THE DRAWING

FIG. 2 is a side view schematically representing sensing apparatus usable with the apparatus of FIG. 1.

FIG. 3 is a view in partial section illustrating sensing apparatus usable with the apparatus of FIG. 1.

DESCRIPTION OF THE PREFERRED EMBODIMENT

Figure 1:
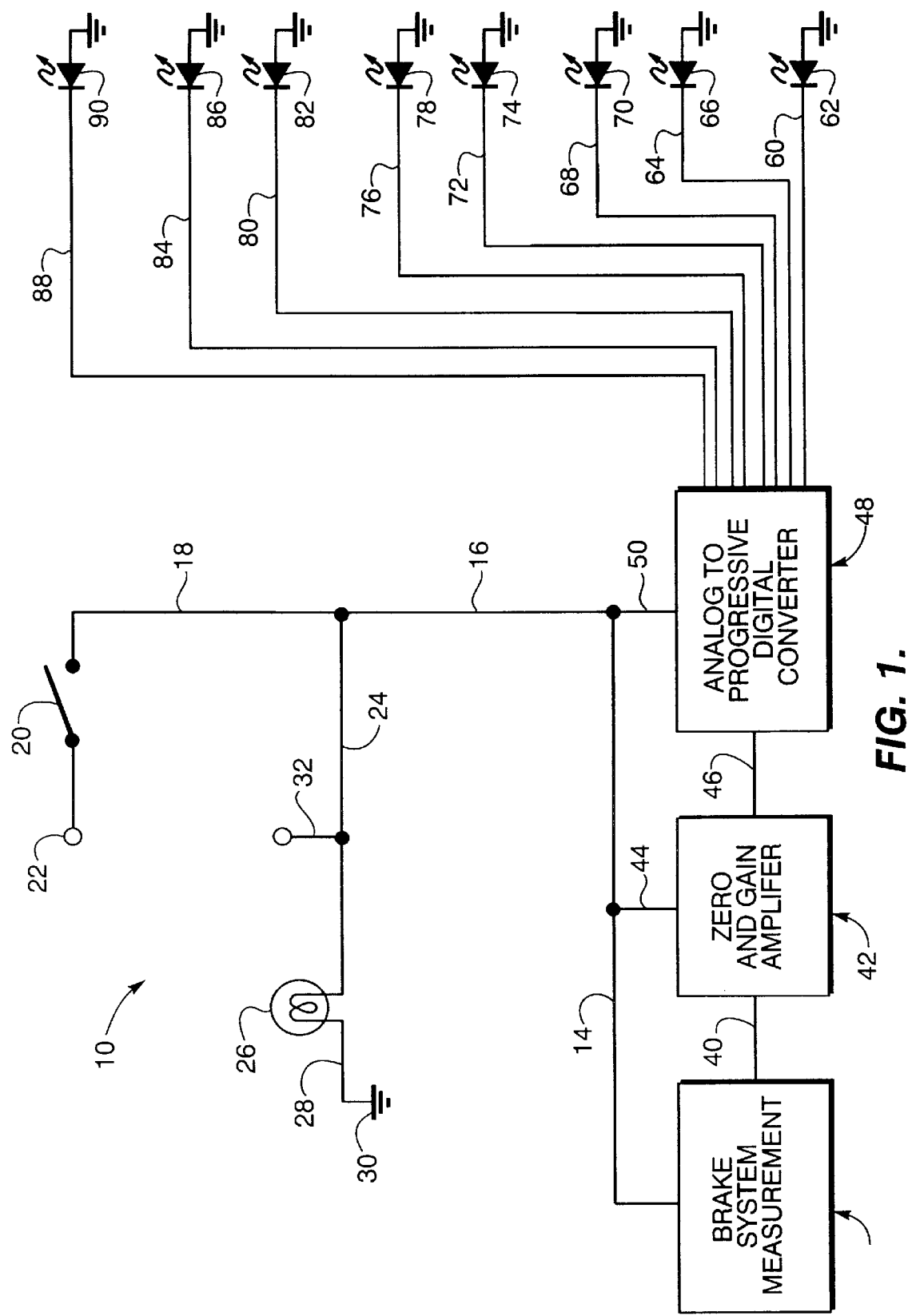
FIG. 1 is a schematic diagram of the apparatus of the present invention.

FIG. 1 comprises a schematic circuit diagram of brake pressure intensity indication system 10 of the present invention. FIG. 1 includes three blocks, including a brake system measurement block 12, a zero and gain amplifier block 42, and an analog to progressive digital converter block 48. A conductor 14 extends from brake system measurement block 12 to a conductor 16. The brake system measurement block 12 is also connected to the zero and gain amplifier block 42 by a conductor 40. The amplifier 42 is connected to the conductor 14 by a conductor 44. The amplifier 42 is connected to the converter 48 by a conductor 46, and the converter 48 is connected to the conductor 14 by a conductor 50. The conductor 14 extends to a conductor 16 which extends to a conductor 18. The conductor 18 extends through a brake switch 20 to a twelve volt power source 22.

The switch 20 is a brake light switch associated with the brake pedal of a vehicle. Thus, when the brake is applied, the switch 20 closes, and the twelve volt current source 22 is then connected to the conductor 18 and through the conductors 16, 14, 44, and 50 to the three blocks 12, 42, and 48.

A conductor 24 extends through a brake light 26, and from the brake light 26 a conductor 28 extends to the vehicle ground 30. A conductor 32 extends from the conductor 24 to the "other" vehicle brake light.

It will be recognized that the twelve volt current source 22, the brake light switch 20, and the conductors 18, 24, lamp 26, conductor 32 and ground 30 comprise the typical brake light circuitry. However, in the present invention, the conductor 18 also extends to provide electrical power to the brake measurement system 12 through the conductors 16 and 14. The brake measurement system 12 provides an output on conductor 40 in response to the intensity of the brake pressure application. The output of the brake system measurement block 12 on conductor 40 is transmitted to the zero and gain amplifier 42 which in turn amplifies the signal and provides its output signal on conductor 46 to the analog to progressive digital converter block 48. The analog to progressive digital converter system 48 in turn provides outputs on conductors to an array of lamps or L.E.D.s. It will be noted that in FIG. 1, L.E.D.s are indicated, 5 but it will be understood that any appropriate lamp may be used. The result is a ladder of lights, the numerically progressive illumination of which is indicative of the intensity of the brake pressure application.

Four levels of brake pressure indication are illustrated with eight conductors and lamps extending from the block 28. For example, there are typically two brake lights on a vehicle. Conductors 60 and 64 extend from the block 28 to a pair of L.E.D.s 62 and 66, respectively, which may illuminate as a conventional third brake light. Conductors 68 and 72 extend from the block 48 to a pair of L.E.D.s 70 and 74, respectively, which, when illuminated, provide an indication of relatively low brake pressure intensity. Conductors 76 and 80, which extend from the block 28 to a pair of L.E.D.s 78 and 82, respectively, illuminate in response to a moderate intensity of brake pressure application. Conductors 84 and 88 extend from the block 28 to a pair of L.E.D.s 86 and 90, respectively, and the illumination of L.E.D.s 86 and 90 then indicate a high intensity of brake pressure application. The respective L.E.D.s remain illuminated until the brake pressure is removed, thus providing a vivid visual indication of brake pressure intensity.

Obviously, there may be as many L.E.D.s utilized as desired. For example, the eight L.E.D.s illustrated may be configured in tow vertical arrays, or ladders, on opposite sides of the rear window of a vehicle. An alternative may be to utilize the eight L.E.D.s as a single array on one side of the rear window and provide an additional eight in parallel on the opposite side of the rear window.

FIG. 2 comprises a schematic representation of the senor elements usable with the apparatus of the present invention. There is shown the brake system measurement block 12 which includes within it a potentiometer, and an arm 110 is coupled to the potentiometer within the block 12. The block 12 is appropriately secured to part of the vehicle chassis 2.

Also secured to a portion of the vehicle chassis 2, as is known and understood, is a brake arm 114 to which is secured a brake pedal 112. The elements involved with the brake pedal 112 and its arm 114 have been omitted for purposes of clarity with respect to the present invention.

Depressing the brake pedal 112 causes movement of the brake arm 114, and with it is movement of the actuating arm 110 of the potentiometer within the block 12. The intensity of the pressure applied to the brake is, of course, measured by the movement of the brake arm 114, and accordingly of the actuating arm 110. The output of the potentiometer within the block 12 then provides the output as discussed above with respect to FIG. 1 and the blocks 42 and 48 to the L.E.D. array.

An alternate sensor system, as an after market application, is illustrated in FIG. 3. FIG. 3 illustrates, in partial section, sensor elements associated with a brake hose 160 for providing an output for the block 12 as illustrated in FIG. 1 and discussed above.

In FIG. 3, a clamp unit 130 is shown disposed about the brake hose 160. The clamp unit 130 includes a bottom plate 132, with a pillow 134 extending upwardly from the bottom plate. The hose 160 is clamped on the pillow 134. A top plate 140 is spaced apart from the bottom plate 132 by a pair of posts 136 and 138. The posts 136 and 138 are secured to the bottom plate 132 and the top plate 140 by bolts 150 and 154 and their respective nuts 152 and 156.

The top plate 140 includes a recess 142 in which is disposed a strain gauge sensor 144. A conductor 146 extends from the strain gauge sensor 144 to provide an output responsive to the brake pressure applied. The conductor 146 extends to the brake system block 12.

The brake pressure applied will cause an expansion of the brake hose 160. The expansion of the brake hose 160 is indicative of the intensity of the brake pressure applied. Accordingly, the output of the strain gauge sensor 144 will also be responsive to the intensity of the applied brake pressure.

Returning again to FIG. 1, when the switch 20 is closed, indicating that the brake pedal has been pushed, the vehicle brake lights, such as the lamp 26 and the second lamp, not shown, but provided with current from conductors 18, 24, and 32, the L.E.D.s 62 and 66 will also be illuminated. Depending on the intensity of the brake pedal application, additional pairs of L.E.D.s in the array will also be illuminated. Maximum intensity will illuminate all of the L.E.D.s in the array.

A pair of such L.E.D. arrays as illustrated in FIG. 1, and parallel with each other, and disposed on opposite sides of the rear window, for example, will provide a very noticeable indication to following drivers of the intensity of the brake application by the driver of the vehicle employing the apparatus 10.

It will be understood that there may be as many L.E.D.s in an array as desired, or as practical for any particular installation. The L.E.D.s in the array of FIG. 1 are merely illustrative.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claimed is:

1. Apparatus for indicating the intensity of brake pressure application in a vehicle having an electrical system and a brake light and a brake pedal comprising in combination:

means for measuring the intensity of brake pressure applied to the brake pedal, including a brake hose and a strain gauge sensor coupled to the brake hose for sensing expansion of the brake hose in response to the intensity of brake pressure;

means for providing an output signal in the electrical system in response to the means for measuring the intensity of brake pressure; and a plurality of lights sequentially illuminated in response to the output signal.

2. The apparatus of claim 1 which further includes a switch connected to the electrical system and actuated by movement of the brake pedal for providing electrical current to illuminate the brake light and the plurality of lights.

3. The apparatus of claim 2 in which the plurality of lights are light emitting diodes.

4. The apparatus of claim 2 in which the plurality of lights comprises a ladder of lights arranged vertically for indicating the intensity of brake pressure applied to the brake pedal.

* * * * *